(12) United States Patent
Gattavari et al.

(10) Patent No.: US 6,424,549 B1
(45) Date of Patent: Jul. 23, 2002

(54) LOW CONSUMPTION CONVERTER DIRECTLY CONNECTABLE TO THE MAINS

(75) Inventors: Giuseppe Gattavari, Busto Arsizio; Claudio Adragna, Monza, both of (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 0 days.

(21) Appl. No.: 09/916,185

(22) Filed: Jul. 26, 2001

(30) Foreign Application Priority Data

Jul. 28, 2000 (EP) ............................................ 00830540

(51) Int. Cl.⁷ ................................................ H02M 5/42
(52) U.S. Cl. ........................................................ 363/89
(58) Field of Search ............................. 363/52, 53, 84, 363/89, 125, 127

(56) References Cited

U.S. PATENT DOCUMENTS

| | | | |
|---|---|---|---|
| 5,600,549 A | 2/1997 | Cross | 363/46 |
| 5,726,871 A | 3/1998 | Choi | 363/89 |
| 5,757,166 A | 5/1998 | Sodhi | 323/222 |
| 5,790,389 A * | 8/1998 | Hua | 363/20 |
| 5,903,138 A | 5/1999 | Hwang et al. | 323/266 |
| 5,960,207 A | 9/1999 | Brown | 395/750.01 |
| 6,043,633 A | 3/2000 | Lev et al. | 323/222 |
| 6,108,222 A * | 8/2000 | Liang | 363/48 |
| 6,177,645 B1 * | 1/2001 | Church et al. | 219/121.39 |

FOREIGN PATENT DOCUMENTS

DE 19805373 8/1999 ............ H02M/7/12

* cited by examiner

*Primary Examiner*—Matthew Nguyen
(74) *Attorney, Agent, or Firm*—Lisa K. Jorgenson; Allen, Dyer, Doppelt, Milbrath & Gilchrist, P.A.

(57) ABSTRACT

A converter that is directly connectable to an AC power source (e.g., the mains) includes a rectifier stage for rectifying a network voltage, a power factor correction pre-regulating circuit supplied with the rectified network voltage for producing a DC voltage of a predetermined nominal value on an output node, and a DC-DC converter. The DC-DC converter may be supplied on an input node thereof with the DC voltage of the predetermined nominal value for producing a regulated DC voltage on an output node thereof. The DC-DC converter may use a clock whose frequency is selected between at least one low and one high value by a selection signal. Furthermore, the converter may also include a stand-by circuit for producing the selection signal based upon the current delivered to the load.

26 Claims, 2 Drawing Sheets

LOW CONSUMPTION CONVERTER DIRECTLY CONNECTABLE TO THE MAINS

FIELD OF THE INVENTION

The present invention relates to the field of electronic circuits, and, more particularly, to converters, adapters, battery chargers and similar circuits. Specifically, the invention relates to a low consumption converter directly connectable to the mains or an AC power source.

BACKGROUND OF THE INVENTION

Power supplies typically include a DC-DC converter coupled to an AC power source (e.g., the mains) through one or more stages. In a pulse width modulation (PWM) switching converter, a square wave drives the control terminal of a power switch and determines whether it is conductive or not conductive. The output voltage is increased by increasing the duration of the phase of conduction of the switch, and decreased by increasing the duration of the phase during which there is no conduction. Thus, the output voltage is controlled by varying the duty cycle of the driving square wave.

When the power switch is a MOS transistor, a non-negligible amount of power is spent to periodically charge the gate of the switching transistor. Power dissipation increases with an increase in the switching frequency and noticeably affects the overall efficiency of the converter. In particular, such a power dissipation lowers the efficiency of the converter, which is particularly true when the load is relatively small. For this reason, typical prior art devices provide for a lowered switching frequency when supplying a relatively small load.

In the following description reference will be made to a two stage converter, as illustrated in FIG. 1, because of its far greater diffusion than other types of converters. Yet, the following considerations are equally applicable to a converter with a number of stages greater than two.

As illustrated in FIG. 1, a two stage converter may include a rectifier coupled to an AC power source, a power factor correction pre-regulating circuit PFC supplied with the rectified voltage and producing a DC voltage of a certain nominal value. Further, a DC-DC converter is input with the nominal DC voltage and controls a load. The DC-DC converter may be based on a control scheme of any suitable kind (e.g., PWM, quasi resonant, resonant, etc.).

A well known solution to reduce energy consumption under relatively small or null load conditions includes reducing the switching frequency of the switches of the PFC stage or of the DC-DC stages, separately. Even if the energy savings that can be obtained thereby is not negligible, the energy consumption remains conspicuously large in the case of systems that remain in a stand-by state or supply a relatively small load for a long time.

Several converters which attempt to address this problem are known in the art. Such converters show enhanced performance in terms of energy savings because, under conditions of relatively small load, the PFC pre-regulating circuit is automatically set to a low consumption (quiescent) condition. On the contrary, when the load increases the PFC resumes its normal functioning. This provides for an increased output power requisite.

By turning off the PFC, the voltage on the bulk capacitor Co that couples the PFC to the converter drops from the level of the regulated voltage to the lower rectified and filtered network voltage. Considering the fact that the leakage current of the capacitor increases as the applied voltage increases approximately according to the following formula:

$$I_{leak} \geq 0.02 * C(\mu F) * V_R(V) + 15 \, \mu A,$$

the turning off of the PFC reduces capacitor losses. Moreover, lowering the voltage on the capacitor Co and the voltage supplied to the converter reduces the switching losses of the converter and the PFC.

U.S. Pat. No. 5,903,138 discloses a two-stage switching regulator that operates in one of four functioning modes, selected according to load conditions. A drawback of this regulator is the fact that it requires a relatively complicated logic circuit for switching from one functioning mode to another. Moreover, such a regulator may change its functioning mode even if the load remains constant, and it may cause the generation of electric noise at audible frequencies.

U.S. Pat. No. 5,726,871 discloses a power supply circuit for a video display capable of reducing power consumption. To this end, the functioning of its power factor correction is controlled by an external microcomputer depending on functioning conditions of the video display.

Furthermore, U.S. Pat. No. 5,960,207 discloses a power supply including a power factor correction and a controller that disables the power factor correction when the power supply is operating in a low power mode. Monitoring of the load is carried out in the secondary circuit of the power supply which is isolated from the primary circuit according to safety rules. Therefore, the control command produced by the controller for disabling the power factor correction must be transmitted to the primary circuit of the power supply using a device appropriate to keep such an isolation, such as an optoelectronic switching coupler.

SUMMARY OF THE INVENTION

In view of the foregoing background, it is therefore an object of the invention to provide a converter directly connectable to an AC power source (e.g., the mains) that allows a significant reduction of power dissipation by turning off its PFC when the load is smaller than a certain threshold, substantially avoiding the risk of generating electrical noise at audible frequencies.

It is another object of the invention to provide such a converter which has a relatively simple control circuit and that may be realized in an integrated form.

This and other objects, features, and advantages in accordance with the present invention are provided by a converter that is directly connectable to the mains that includes a rectifier stage for rectifying a network voltage and a power factor correction pre-regulating circuit supplied with the rectified network voltage for producing a DC voltage of a certain nominal value on an output node. The converter further includes a DC-DC converter supplied on an input node thereof with the DC voltage of the nominal value for producing a regulated DC voltage on an output node thereof. The DC-DC converter may use a clock whose frequency is selected between at least one low and one high value by a selection signal. A stand-by circuit may also be included for producing the selection signal based upon the current delivered to the load.

One advantageous feature of the converter of the invention is that it may include a control circuit having a comparator for receiving the selection signal and generating a disabling signal for the power factor correction pre-regulating circuit. The disabling signal is generated so long as the selection signal assumes a value corresponding to the low frequency value of the driving clock.

The power factor correction pre-regulating circuit may include a correction circuit that receives at an input thereof a signal representing the desired nominal DC voltage and produces a correction signal, and a power device driver that is supplied with the rectified network voltage and receives as inputs an enabling signal and the correction signal. The power device driver produces the nominal DC voltage on an output node thereof so long as the enabling signal is disabled. The power factor correction pre-regulating circuit may also include an enabling circuit for producing the enabling signal when the voltage on a control node is zero. Moreover, the power factor correction may be turned on or off by electrically isolating or coupling the control node to a reference voltage using a switch driven by the disabling signal.

BRIEF DESCRIPTION OF THE DRAWINGS

The various aspects and advantages of the invention will become more evident through a detailed description of the invention with reference to the attached drawings, in which.

DETAILED DESCRIPTION OF THE PREFERRED EMBODIMENTS

A converter according to the invention may be realized with a common DC-DC converter, a power factor correction pre-regulating circuit, and a control circuit for controlling the functioning of the PFC of the converter. Typically, DC-DC converters function at a clock frequency selectable between at least one low and one high value. The low frequency is used in small load conditions for reducing the power consumption. The DC-DC converter selects the clock frequency by providing a selection signal, which depends on the load conditions, to its oscillator.

Figure 1:
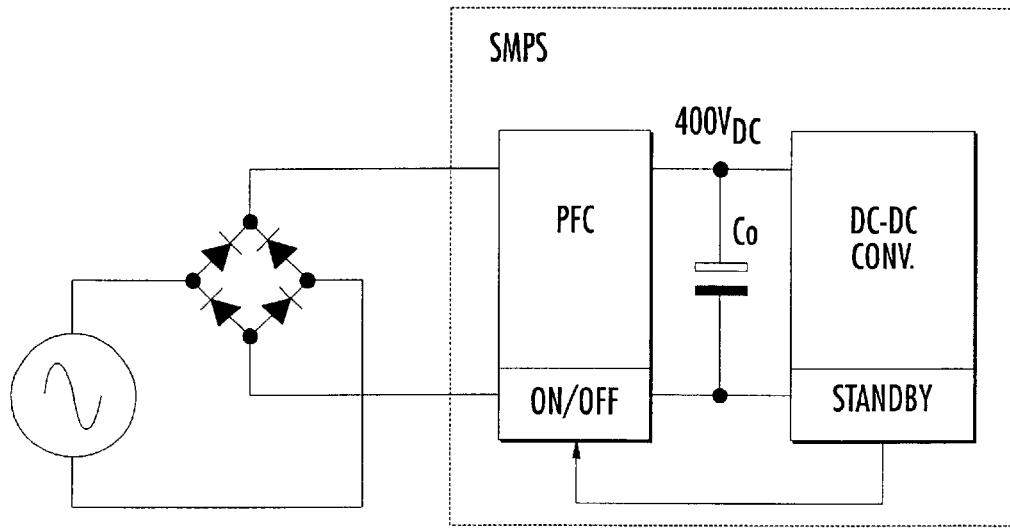
FIG. 1 is a schematic block diagram of a two stage converter according to the present invention.
Figure 2:
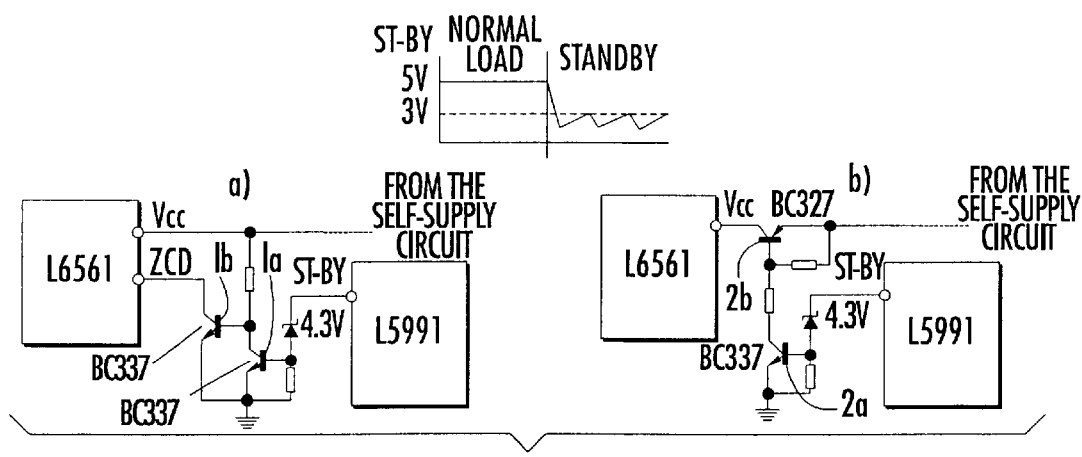
FIG. 2 is a schematic block diagram illustrating two possible embodiments of the invention.
Figure 3:
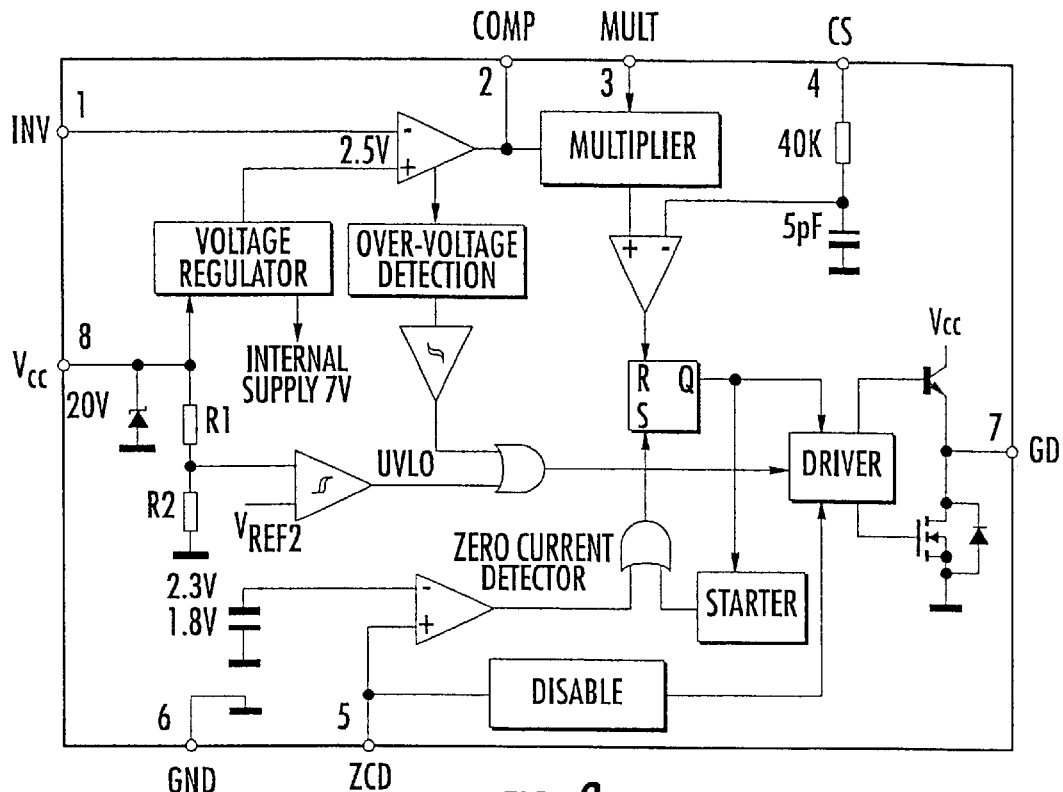
FIG. 3 is a schematic block diagram of the prior art L6561 PFC pre-regulating circuit shown in FIG. 2.

The control circuit of the converter of the present invention may be realized in integrated form relatively easily and without using external devices, such as optoelectronic switching couplers, because it utilizes the selection signal for disabling the PFC. Two possible embodiments of the invention which conveniently use commercially available components (i.e., an L6561 PFC pre-regulating circuit and an L5991 DC-DC converter, both manufactured by STMicroelectronics S.r.l., assignee of the present invention), are shown in FIG. 2. Schematic block diagrams of the L6561 and L5991 devices are illustratively shown in FIGS. 3 and 4, respectively.

The L6561 device includes a correction circuit supplied with the rectified network voltage Vcc and by a power device driver DRIVER. The correction circuit receives at an input INV a signal representing the desired nominal DC voltage produced by the PFC and generates a correction signal. The power device driver DRIVER is supplied with the voltage Vcc and produces a DC voltage of a certain nominal value, adjusted as a function of the correction signal, on an output node GD. The L6561 device also includes an enabling circuit DISABLE that disables the power device driver DRIVER when the voltage on the control node ZCD is zero. In this case, the PFC may be turned off simply by grounding the node ZCD. This can be done using the control circuit illustrated in FIG. 2a and connected between the two commercially available devices.

The transistor 1a, as is the case with the transistor 2a, is coupled to a Zener diode and acts as a comparator. This comparator produces, on the base of transistor 1b (2b), a zero collector-emitter voltage when the voltage on the node ST-BY is greater than or equal to 5V, and a voltage suitable to set the transistor 1b (2b) in a conduction state on ST-BY when a voltage lower than 5V is present. This collector-emitter voltage is the disabling signal. The transistor 1b is a switch driven by the disabling signal that isolates or grounds the node ZCD of the L6561 device.

Figure 4:
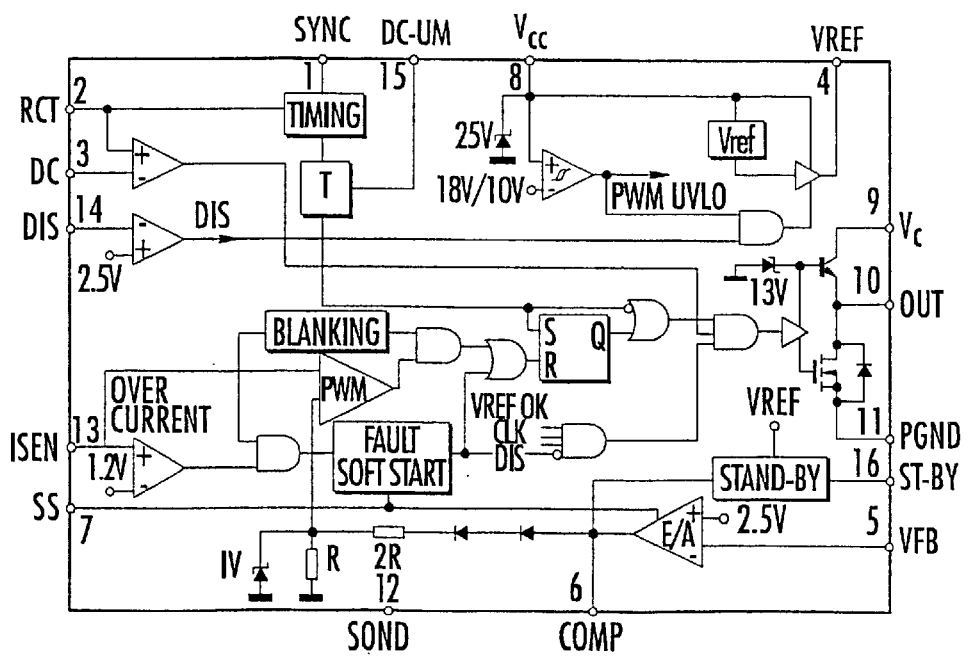
FIG. 4 is a schematic block diagram of the prior art L5991 DC-DC converter shown in FIG. 2.

An alternative way of turning off the L6561 device includes disconnecting it from the supply line in the way shown in FIG. 2b. In this second embodiment the switch 2b driven by the disabling signal couples the L6561 device to the rectified network voltage Vcc. The commercial L5991 device, whose block diagram is shown in FIG. 4, has a logic circuit regulating the PWM driving signal which receives on the input node ISEN a signal representing the current delivered to the load. On the node DC it receives a signal representing the desired duty-cycle, and on the node RCT it receives a clock signal provided by an external oscillator. The load is coupled to the output nodes OUT and PGND.

The L5991 device also has a stand-by circuit STAND-BY producing a selection signal on the node ST-BY. This reduces the frequency of the external oscillator that generates the clock signal whenever the load drops below a certain pre-established threshold. Even when the PFC is in a low consumption mode, the L5991 device works at a certain frequency which does not vary in as much as the load does not overcome the pre-established threshold. Working at an established frequency, the risk of generating noise at acoustic frequencies is prevented, or at least noticeably reduced.

Such a stand-by circuit is typically present in several other commercially available converters for reducing the switching losses when the load is relatively small. The improved converter of the invention can be relatively easily realized by inputting the selection signal, which is already generated by such commercially available converters, to any one of the two control circuits of FIG. 2.

That which is claimed is:

1. A voltage converter comprising:
   a rectifier stage connected to the mains and providing a rectified voltage;
   a power factor correction pre-regulating circuit for receiving the rectified voltage and providing a DC voltage having a predetermined nominal value;
   a DC-DC converter for receiving the DC voltage and providing a regulated DC voltage to a load;
   a clock for providing a clock signal to said DC-DC converter having a frequency selectable between at least a low value and a high value based upon a selection signal;
   a stand-by circuit for providing the selection signal to said clock based upon a current delivered to the load; and
   a control circuit comprising a comparator for providing a disabling signal to said power factor correction pre-regulating circuit based upon the selection signal assuming the low value.

2. The voltage converter according to claim 1 wherein said rectifier stage is directly connectable to the mains.

3. The voltage converter according to claim 1 wherein said power factor correction pre-regulating circuit comprises a correction circuit for receiving a signal corresponding to the predetermined nominal value and producing a correction signal.

4. The voltage converter according to claim 3 wherein said power factor correction pre-regulating circuit further comprises a power device driver for receiving the rectified voltage, an enabling signal, and the correction signal and providing the DC voltage having the predetermined nominal value when the enabling signal is disabled.

5. The voltage converter according to claim 4 wherein said power factor correction pre-regulating circuit further comprises an enabling circuit for providing the enabling signal when a voltage at a control node of said power factor correction pre-regulating circuit is substantially zero.

6. The voltage converter according to claim 5 wherein said power factor correction pre-regulating circuit further comprises a switch driven by said disabling signal for selectively electrically isolating the control node and coupling the control node to a reference voltage.

7. The voltage converter according to claim 1 wherein said control circuit further comprises a switch driven by said disabling signal for selectively electrically connecting and disconnecting said power factor correction pre-regulating circuit to and from the rectified voltage.

8. The voltage converter according to claim 1 wherein said DC-DC converter continues to operate at the frequency when said power factor correction pre-regulating circuit is disabled.

9. A voltage converter comprising:
   a rectifier stage connected to an AC power supply for providing a rectified voltage;
   a power factor correction pre-regulating circuit for receiving the rectified voltage and providing a DC voltage having a predetermined nominal value;
   a DC-DC converter for receiving the DC voltage and providing a regulated DC voltage to a load based upon a clock signal having a frequency selectable between at least a low value and a high value based upon a selection signal;
   a stand-by circuit for providing the selection signal based upon a current delivered to the load; and
   a control circuit for providing a disabling signal to said power factor correction pre-regulating circuit based upon the selection signal assuming the low value, said DC-DC converter continuing to operate at the frequency when the power factor correction pre-regulating circuit is disabled.

10. The voltage converter according to claim 9 wherein said power factor correction pre-regulating circuit comprises a correction circuit for receiving a signal corresponding to the predetermined nominal value and producing a correction signal.

11. The voltage converter according to claim 10 wherein said power factor correction pre-regulating circuit further comprises a power device driver for receiving the rectified voltage, an enabling signal, and the correction signal and providing the DC voltage having the predetermined nominal value when the enabling signal is disabled.

12. The voltage converter according to claim 11 wherein said power factor correction pre-regulating circuit further comprises an enabling circuit for providing the enabling signal when a voltage at a control node of said power factor correction pre-regulating circuit is substantially zero.

13. The voltage converter according to claim 12 wherein said power factor correction pre-regulating circuit further comprises a switch driven by said disabling signal for selectively electrically isolating the control node and coupling the control node to a reference voltage.

14. The voltage converter according to claim 9 wherein said control circuit further comprises a switch driven by said disabling signal for selectively electrically connecting and disconnecting said power factor correction pre-regulating circuit to and from the rectified voltage.

15. The voltage converter according to claim 9 wherein said control circuit comprises a comparator for comparing the selection signal and the low value.

16. An integrated circuit comprising:
   a voltage converter comprising
      a rectifier stage connected to an AC power supply and providing a rectified voltage,
      a power factor correction pre-regulating circuit for receiving the rectified voltage and providing a DC voltage having a predetermined nominal value,
      a DC-DC converter for receiving the DC voltage and providing a regulated DC voltage to a load;
      a clock for providing a clock signal to said DC-DC converter having a frequency selectable between at least a low value and a high value based upon a selection signal,
      a stand-by circuit for providing the selection signal to said clock based upon a current delivered to the load, and
      a control circuit for providing a disabling signal to said power factor correction pre-regulating circuit based upon the selection signal assuming the low value.

17. The integrated circuit according to claim 16 wherein said power factor correction pre-regulating circuit comprises a correction circuit for receiving a signal corresponding to the predetermined nominal value and producing a correction signal.

18. The integrated circuit according to claim 17 wherein said power factor correction pre-regulating circuit further comprises a power device driver for receiving the rectified voltage, an enabling signal, and the correction signal and providing the DC voltage having the predetermined nominal value when the enabling signal is disabled.

19. The integrated circuit according to claim 18 wherein said power factor correction pre-regulating circuit further comprises an enabling circuit for providing the enabling signal when a voltage at a control node of said power factor correction pre-regulating circuit is substantially zero.

20. The integrated circuit according to claim 19 wherein said power factor correction pre-regulating circuit further comprises a switch driven by said disabling signal for selectively electrically isolating the control node and coupling the control node to a reference voltage.

21. The integrated circuit according to claim 16 wherein said control circuit further comprises a switch driven by said disabling signal for selectively electrically connecting and disconnecting said power factor correction pre-regulating circuit to and from the rectified voltage.

22. The integrated circuit according to claim 16 wherein said DC-DC converter continues to operate at the frequency when the power factor correction pre-regulating circuit is disabled.

23. The integrated circuit according to claim 16 wherein said control circuit comprises a comparator for comparing the selection signal and the low value.

24. A method for converting a supply voltage to a regulated DC voltage for use by a load, the method comprising:
   rectifying a supply voltage;
   performing a power factor correction pre-regulation on the rectified supply voltage to provide a DC voltage having a predetermined nominal value;

converting the DC voltage to a regulated DC voltage using a DC-DC converter and providing the regulated DC voltage to the load;

delivering a clock signal to the DC-DC converter having a frequency selectable between a low value and a high value responsive to a selection signal based upon a current delivered to the load; and disabling performing the power factor correction pre-regulation based upon the selection signal assuming the low value.

25. The method according to claim 24 wherein performing the power factor correction pre-regulation comprises:

generating a correction signal from a signal corresponding to the predetermined nominal value; and providing the DC voltage having the predetermined nominal value based upon the rectified supply voltage and the correction signal when an enabling signal is disabled.

26. The method according to claim 24 wherein converting the DC voltage comprises continuously converting the DC voltage to the regulated DC voltage at the frequency while performing the power factor correction pre-regulation is disabled.

* * * * *

UNITED STATES PATENT AND TRADEMARK OFFICE
CERTIFICATE OF CORRECTION

PATENT NO. : 6,424,549 B1
DATED : July 23, 2002
INVENTOR(S) : Giuseppe Gattavari and Claudio Adragna It is certified that error appears in the above-identified patent and that said Letters Patent is hereby corrected as shown below:

Column 2,
Line 4, delete "$I_{leak} \geq 0.02*C(\mu F)*V_R(V)+15\mu A$," insert -- $I_{leak} \leq 0.02*C(\mu F)*V_R(V)+15\mu A$, --

Column 6,
Lines 22-23, delete "select ion" insert -- selection --

Signed and Sealed this

Thirty-first Day of December, 2002

JAMES E. ROGAN
*Director of the United States Patent and Trademark Office*